United States Patent
Schonebeck

(10) Patent No.: US 7,153,564 B2
(45) Date of Patent: Dec. 26, 2006

(54) METHOD OF PRODUCING A VEHICLE INTERIOR LINING AND VEHICLE INTERIOR LINING

(75) Inventor: Horst Schonebeck, Gelnhausen (DE)

(73) Assignee: ArvinMeritor GmbH, Dietzenbach (DE)

( * ) Notice: Subject to any disclaimer, the term of this patent is extended or adjusted under 35 U.S.C. 154(b) by 142 days.

(21) Appl. No.: 10/643,781

(22) Filed: Aug. 19, 2003

(65) Prior Publication Data

US 2004/0081792 A1   Apr. 29, 2004

(30) Foreign Application Priority Data

Aug. 19, 2002   (DE)   .............................. 102 37 837

(51) Int. Cl.
  *B32B 3/26*   (2006.01)
  *B32B 5/24*   (2006.01)
  *B32B 3/00*   (2006.01)

(52) U.S. Cl. .............................. 428/304.4; 428/309.9; 428/315.9

(58) Field of Classification Search ............. 428/315.9, 428/311.71, 312.6, 411.1, 425.1
  See application file for complete search history.

(56) References Cited

U.S. PATENT DOCUMENTS 4,486,493 A * 12/1984 Burmester et al. .......... 442/308
4,618,532 A    10/1986 Volland et al.
6,010,870 A *  1/2000 Pelzer et al. ................ 435/41
2002/0176980 A1* 11/2002 Marcovecchio .......... 428/316.6

FOREIGN PATENT DOCUMENTS

| | | |
|---|---|---|
| EP | 0 555 476 A1 | 8/1993 |
| GB | 1 439 739 | 6/1976 |
| WO | WO 98/30375 A1 | 7/1998 |
| WO | WO 01/26932 A1 | 4/2001 |

OTHER PUBLICATIONS

European Search Report, Jul. 1, 2004.

\* cited by examiner

*Primary Examiner*—Terrel Morris
*Assistant Examiner*—Lynda Salvatore
(74) *Attorney, Agent, or Firm*—Carlson, Gaskey, & Olds

(57) ABSTRACT

A vehicle interior lining having very good sound absorbing properties and is air-permeable to air comprises an outside decorative layer, a barrier layer arranged on the rear side of the decorative layer, and a foamed layer which directly adjoins the barrier layer and is produced by back foaming. The barrier layer is formed from cellulose fleece and prevents the material used to form the foamed layer from seeping through to the decorative layer. The vehicle interior lining is air-permeable after the foamed layer is cured and can be used as, for example, a roof lining.

21 Claims, 2 Drawing Sheets

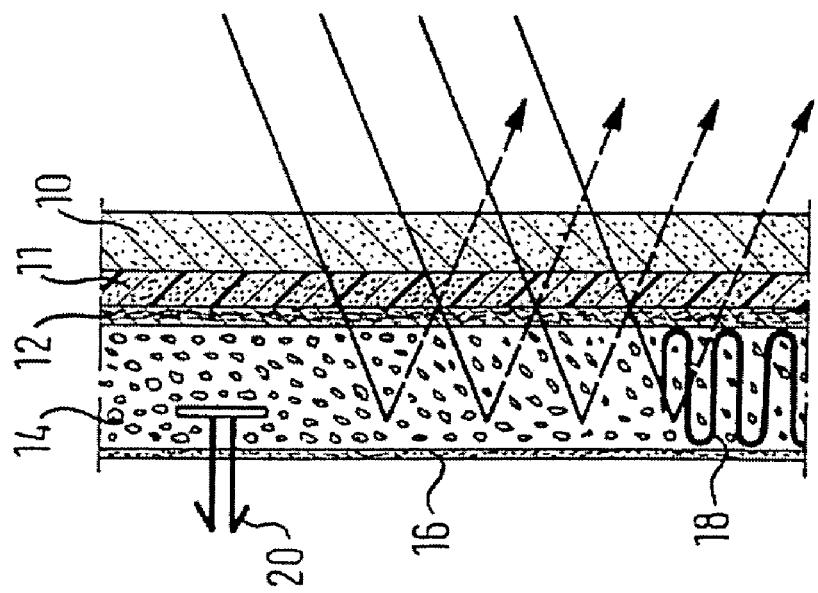
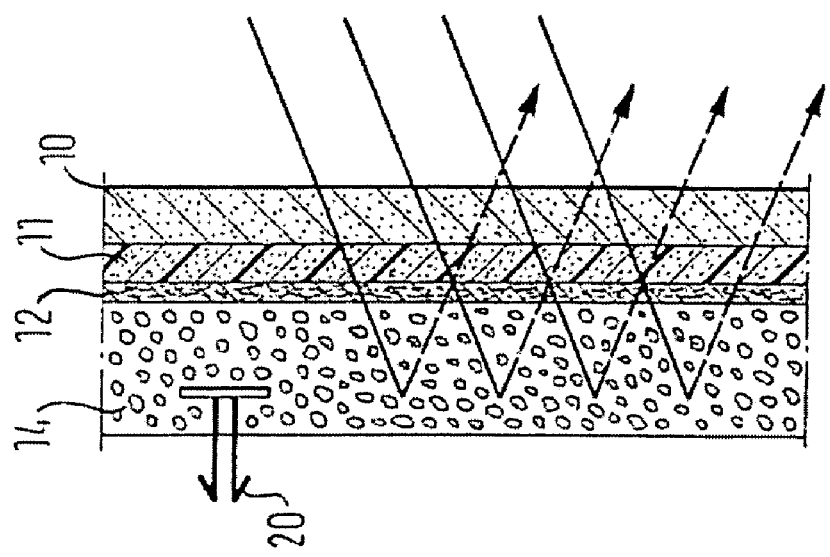

Properties of Barrier Fleece

Determination of the Material Properties pertains to 50 % Air Humidity and T = 23 °C.

| Physical Property | Unit | Preferred Value |
|---|---|---|
| GSM Substance ISO 9073-1 | $g\,m^{-2}$ | 70.0 |
| Dry Tensile Strength (Machine Direction) ISO 9073-3 | $N\,m^{-1}$ | 3200 |
| Dry Tensile Strength (Transverse Direction) | $N\,m^{-1}$ | 850 |
| Elmendorf Tear Strength (Machine Direction) ISO 9073-4 | mN | 5600 |
| Dry Elongation (Machine Direction) ISO 9073-3 | % | 25 |
| Dry Elongation (Transverse Direction) ISO 9073-3 | % | 100 |
| Air Permeability | $1\,min^{-1}\,100\,cm^{-2}$ | 55-120 |
| Water Permeability | mbar | 23 |
| Alcohol Repulsion Ability IST 80,6 - 92 | graduation | 10 |

Fig. 3

METHOD OF PRODUCING A VEHICLE INTERIOR LINING AND VEHICLE INTERIOR LINING

REFERENCE TO RELATED APPLICATIONS

The present invention claims the benefit of German Patent Application No. 102 37 837.1, filed Aug. 19, 2002.

TECHNICAL FIELD

The invention relates to a method of producing a vehicle interior lining, in particular a roof lining, comprising an outside decorative layer, a barrier layer arranged on the rear side of the decorative layer, and a layer which directly adjoins the barrier layer and is produced by back foaming. The invention further relates to a vehicle interior lining produced by the method according to the invention.

BACKGROUND OF THE INVENTION

Known vehicle interior linings are usually produced as follows. A decorative layer, in particular a textile, is laminated on the rear side by applying a soft plastic layer. This is intended to give the vehicle interior lining a so-called soft touch, i.e., haptics of higher quality. A so-called barrier film is glued to the soft layer on the rear side thereof. The intermediate product thus produced is then provided with a foam backing of polyurethane (PU) material, with the barrier film preventing liquid PU material from penetrating into the soft plastic layer and the textile layer and becoming visible from the outside.

Currently, increasingly higher demands are made on vehicle interior linings in terms of sound absorption ability. In current structures, sound can partially be reflected by the barrier film, decreasing sound absorption ability. Removing the barrier film, however, would increase the risk of the liquid PU material becoming visible on the front side toward the interior vehicle space when it contacts the rear side of the decorative layer. Textile fabric and imitation leather are often used as the decorative layer; imitation leather, however, is usually made to be permeable to air in this application. The air permeability of the decorative layer increases the risk of liquid PU material seepage to the front side, necessitating the use of the sound-reflecting barrier film.

There is a desire for a vehicle interior lining structure having improved sound absorption ability without increasing the risk of foam backing material seepage to the front side.

SUMMARY OF THE INVENTION

The invention is directed to a simplified vehicle interior lining structure and manufacturing method. The inventive vehicle interior lining is distinguished by a simple structure, enhanced sound absorption ability and air permeability. Further, the quality of the appearance is at least equal to that of a vehicle interior lining according to the above-mentioned prior art.

One embodiment of the invention comprises an air-permeable cellulose fleece, which is used as barrier layer, and a foam backing provided on a rear side of the barrier layer. The barrier layer is formed such that a plastic material applied to the barrier layer during a back foaming process does not penetrate the barrier layer, and the resulting combination of the barrier layer and the foamed layer is permeable to air after curing.

The air-permeable cellulose fleece can be produced very simply and at very low cost by bonding the cellulose fleece fibers with a binding agent, for instance. The fleece can be produced on paper manufacturing lines where the air permeability of the fleece can easily be adjusted. The invention allows the barrier film to be completely omitted, allowing sound to penetrate into the thick back foamed layer. Thus, the inventive lining piece has improved sound absorption characteristics. The barrier effect is accomplished by the attractively priced barrier layer formed from the air-permeable cellulose fleece.

In one embodiment, the method produces an intermediate product comprising a decorative layer and a barrier layer. additionally, there may further be provided a soft intermediate layer made of cellular material for achieving the "soft touch" feel in the final product. This intermediate product is then provided with a foam backing. Some of the layers of the intermediate product, preferably all of them, are bonded to each other by gluing. This gluing process may, for instance, be effected by a thermoplastic, pulverulent glue applied to at least one of the layers to be bonded. The intermediate product can also be produced by laminating, of course.

The cellulose fibers can be any material, such as sisal fibers. The fleece used in the barrier layer preferably has a gsm substance of 50 to 200 g/m$^2$, which in experiments has turned out to be particularly advantageous. Further, the fleece used as the barrier layer preferably has an air permeability of about 55 to 120 l per 100 cm$^2$.

Optionally, a fiber mat, for example a glass fiber mat or a mat of natural fibers, can be embedded into the foamed layer on the rear side thereof during the back foaming process. It is also possible to apply the fiber mat to the rear side of the foamed layer, with the possibility of fastening the lining piece to the vehicle through the fiber mat. Polyurethane (PU) material is preferably used for the foam backing layer.

Textile fabric and imitation leather are two possible materials to be used as the decorative layer. The imitation leather should be made air-permeable, which would ordinarily lead to the risk of the liquid PU material becoming visible on the front side, namely towards the vehicle interior space, when it contacts with the rear side thereof. However, the barrier layer prevents seepage of the liquid PU material to the decorative layer without requiring a sound-reflective barrier film. The imitation leather preferably is a perforated smooth leather or an artificial suede.

The invention further relates to a vehicle interior lining, in particular a roof lining produced by the inventive method and to a layer structure which, starting from the inside of the vehicle, is comprised of a decorative layer, a barrier layer made of air-permeable cellulose fleece that is attached to the rear side of the decorative layer, and a foamed layer directly adjoining the cellulose fleece layer and produced by back foaming. This structure prevents the back foamed layer material from reaching the decorative layer without requiring a barrier film, improving the sound absorption qualities of the structure.

BRIEF DESCRIPTION OF THE DRAWINGS

Further features and advantages of the invention will be apparent from the following description and the drawings in which:

FIG. 1 is a cross-sectional view through a section of a vehicle interior lining according to one embodiment of the invention in the form of a roof liner, FIG. 2 is a cross-sectional view through a vehicle interior lining according to a second embodiment, and FIG. 3 is a chart showing the physical properties of the preferably used fleece according to one embodiment of the invention.

DETAILED DESCRIPTION OF THE EMBODIMENTS

FIG. 1 is a cross-section view of a portion of a vehicle interior lining in the form of a roof liner as a part of an entire roof module according to one embodiment of the invention. The vehicle interior lining is realized to have a large surface area and is structured as illustrated in the section view across the entire or virtually the entire surface. Towards the vehicle interior space, only the decorative layer 10 is visible. The decorative layer 10 is preferably formed of a textile fabric permeable to air or an imitation leather permeable to air.

Directly adjoining the rear side of the decorative layer 10 is an intermediate layer 11 made of a soft cellular material cut to size. A barrier layer 12 directly adjoins the rear side of the intermediate layer 11. Directly adjoining the rear side of the barrier layer 12 is a foamed layer 14. In one embodiment, the foamed layer 14 is made from a liquid plastic, such as polyurethane (PU), that is directly applied to the barrier layer 12 by a back foaming process.

The barrier layer 12 is produced from a cellulose fleece which is permeable to air, the fleece fibers being bonded to each other by a binding agent. Sisal is preferably used. The gsm substance of the unprocessed fleece is about 50 to 200 $g/m^2$ and the air permeability is about 55 to 120 l per 100 $cm^2$.

Further physical properties of one preferred embodiment of the fleece are listed in FIG. 3. The fleece has a gsm substance, a specific gravity and a thickness that prevents penetration of any liquid plastic material that is directly applied to the rear side of the barrier layer 12 during the foaming process.

The method of producing the vehicle interior lining will be described below. First, the decorative layer 10, the intermediate layer 11 and the barrier layer 12 are bonded to each other to form an intermediate product. This can be done by a laminating process or, to be more precise, by bonding using a thermoplastic glue. The glue is available as a powder and can be applied to at least one of the layers to be bonded to each other. The layers are then bonded to each other by heating.

Next, this intermediate product is placed in a foaming mold, and liquid plastic material, such as PU material, is introduced on the rear side to provide the intermediate product with a foam backing.

The barrier layer 12 is chosen so that no liquid PU material can penetrate the barrier layer 12 completely during back foaming, preventing the material from coming through the intermediate layer 11 or the decorative layer 10. Thus, there is no risk that the PU material will appear on the outside of the decorative layer 10.

Because there is no barrier film in the inventive structure, the entire interior space lining is permeable to air as a whole after foaming and curing without requiring any subsequent process steps for achieving air permeability. As a result, the interior space lining has a high sound absorption ability. The arrows illustrated in the Figures symbolize impinging and partially reflected sound waves.

Optionally, the intermediate layer 11 may be omitted so that the rear side of the decorative layer 10 is directly bonded to the rear side of the barrier layer 12, preferably by means of the above described gluing process with thermoplastic gluing material. Here, the fleece used to produce the barrier layer can also be realized with a higher thickness in order to provide the "soft touch" feeling.

The embodiment according to FIG. 2 is largely identical in terms of its structure and its method of producing to the one explained above. For simplicity, similar elements will be referenced using the same reference numerals.

In this embodiment, there is provided a fiber mat 16 on the rear side for enhancing the stability and for easier mounting to an adjoining vehicle component (e.g. the remainder of the roof module). This fiber mat 16 is either fastened to the rear side of the foamed layer 14 produced by back foaming or is likewise placed in the foaming mold and, hence, embedded in the foamed layer 14.

As an alternative, the fiber mat 16 may also be dispensed with and fibers (in particular glass fibers) can be introduced in the foamed layer 14 during the foaming process instead. In one embodiment, the fibers can be introduced using a so-called LFI (Long Fiber Injection) method. In this case, the barrier layer 12 should be engineered to prevent any penetration of the injected fibers up to the intermediate layer 11 or the decorative layer 10.

Instead of a glass fiber mat, it is also possible to provide a natural fiber mat or any other artificial fiber mat, of course.

A spacer 18 can also be embedded in the foamed layer 14 to maintain a specific distance between the fiber mat 16 and the barrier layer 12 during formation of the foamed layer 14. The spacer 18 preferably has a certain spring action. In FIG. 2, the spacer 18 is shown schematically by a double wavy line. The spacer 18 may comprise, for instance, a plastic mat having a very open cellular structure that forms an irregular spatial grid which, judging by appearance, is similar to an osteoporosis bone structure. The spacer 18 preferably is a polyester or polyurethane foamed up in a nitrogen atmosphere and having a low initial density of 20 $kg/m^3$ when foamed up, a compression hardness of approximately 20 kPa, a cell number of about 13 cells per $cm^3$, a tensile strength of about 230 kPa and an elongation at break of approximately 70%.

After the intermediate product has been produced, the intermediate product, the spacer 18, and the fiber mat 16 are placed in the foaming mold and brought in position therein. The positioning can be carried out, for instance, in the upper mold half using a tensioning frame so that the barrier layer 12 is situated at the side of the upper mold half facing the lower mold half. As a next step, the water-like liquid plastic mass, which has been mixed thoroughly in a mixing head, is applied to the fiber mat 16. The liquid plastic mass instantly infiltrates the fiber mat 16 and the spacer 18 and gets in direct contact with the barrier layer 12, partially penetrating the barrier layer 12. The upper mold half of the foaming mold is then laid on the lower mold half and the foaming mold is tightly sealed. Due to its elastic properties, the spacer 18 in combination with the displacement forces of the expanding plastic foam ensures that the optionally patterned surfaces of the mold halves will be reproduced. When a certain reaction time is over, the foaming mold is opened and the resultant one-piece vehicle interior lining is taken out of the foaming mold.

As just discussed, it is important that the liquid plastic can penetrate the spacer 18 without any problems so that the foam produced during the back foaming process for the foamed layer 14 connects the barrier layer 12, the fiber mat 16 and the spacer 18.

In the embodiment of FIG. 2, the intermediate layer 11 can be omitted without substitution.

For a simplified installation of the vehicle interior lining, it is possible to embed fastening means 20 (for example latching elements, eyes, hooks etc.) in the layer 14 during foaming.

It should be understood that various alternatives to the embodiments of the invention described herein may be employed in practicing the invention. It is intended that the following claims define the scope of the invention and that the method and apparatus within the scope of these claims and their equivalents be covered thereby.

The invention claimed is:

1. A vehicle interior lining, comprising;
    a barrier layer made of an air-permeable fleece;
    a decorative layer, wherein the barrier layer is arranged on a rear side of the decorative layer, and wherein the decorative layer and the barrier layer form an intermediate product;
    a soft intermediate layer of cellular material disposed between the decorative layer and the barrier layer in the intermediate product; and
    a foam backing that directly adjoins the barrier layer and that is formed via a back foaming process, wherein the foam backing is formed by applying a liquid plastic to the barrier layer, and wherein the foam backing is formed on the intermediate product, and
    wherein the barrier layer prevents penetration of the liquid plastic through the barrier layer, and wherein a resulting unit of the barrier layer and the foam backing produced by back foaming is permeable to air after curing.

2. The vehicle interior lining according to claim 1, wherein at least two layers of the intermediate product are bonded to each other by gluing.

3. The vehicle interior lining according to claim 2, wherein a thermoplastic, pulverulent glue is applied to at least one layer to bond the at least two layers of the intermediate product.

4. The vehicle interior lining according to claim 1, wherein the intermediate product is produced by laminating.

5. The vehicle interior lining according to claim 1, wherein the air-permeable fleece comprises a plurality of cellulose fibers that are bonded to each other by a binding agent.

6. The vehicle interior lining according to claim 5, wherein the plurality of cellulose fibers are sisal fibers.

7. The vehicle interior lining according to claim 1, wherein the air-permeable fleece used as the barrier layer has a gsm substance of 50 to 200 g/m$^2$.

8. The vehicle interior lining according to claim 1, wherein the air-permeable fleece used as the barrier layer has an air permeability of about 55 to 120 l per 100 cm$^2$.

9. The vehicle interior lining according to claim 1, further comprising a fiber mat attached to a rear side of the foam backing during the back foaming process.

10. The vehicle interior lining according to claim 1, further comprising a fiber mat embedded in the foam backing during the back foaming process.

11. The vehicle interior lining according to claim 1, wherein the liquid plastic is directly applied to the barrier layer and comes into contact with the barrier layer during the back foaming process.

12. The vehicle interior lining according to claim 1, further comprising fibers that are introduced into the liquid plastic during the back foaming process, wherein the fibers are distributed in the foam backing.

13. The vehicle interior lining according to claim 12, wherein the fibers are glass fibers.

14. The vehicle interior lining according to claim 1, wherein the liquid plastic used for back foaming comprises polyurethane.

15. The vehicle interior lining according to claim 1, wherein the decorative layer is a material selected from the group consisting of a textile fabric and an imitation leather.

16. The vehicle interior lining according to claim 1, wherein the entire vehicle interior lining is permeable to air.

17. The vehicle interior lining according to claim 1, further comprising at least one of a spacer and a fastening member in the foam backing, wherein the at least one of the spacer and the fastening member are attached during the back foaming process.

18. The vehicle interior lining according to claim 1 wherein the decorative layer, barrier layer, and foam backing cooperate to form a roof liner.

19. The vehicle interior lining according to claim 1 wherein the air-permeable fleece prevents penetration of liquid plastic through the barrier layer.

20. A vehicle interior lining, comprising;
    a barrier layer made of an air-permeable fleece that prevents penetration of liquid plastic through the barrier layer;
    a decorative layer, wherein the barrier layer is arranged on a rear side of the decorative layer;
    a foam backing that directly adjoins the barrier layer and that is formed via a back foaming process, wherein the foam backing is formed by applying a liquid plastic to the barrier layer,
    wherein the barrier layer prevents penetration of the liquid plastic through the barrier layer, and wherein a resulting unit of the barrier layer and the foam backing is permeable to air after curing; and
    at least one spacer having an open cellular structure capable of being infiltrated by a liquid plastic wherein the at least one spacer is attached to the foam backing during the back foaming process.

21. The vehicle interior lining according to claim 20 including a soft intermediate layer of cellular material disposed between the decorative layer and the barrier layer.

* * * * *